United States Patent
Johnson et al.

(10) Patent No.: US 7,940,992 B2
(45) Date of Patent: May 10, 2011

(54) VISUAL DISCRIMINATION MODEL FOR SINGLE IMAGE APPLICATIONS

(75) Inventors: Jeffrey P. Johnson, Lawrenceville, NJ (US); John S. Nafziger, Prescott, AZ (US)

(73) Assignee: Siemens Aktiengesellschaft, München ( * ) Notice: Subject to any disclaimer, the term of this patent is extended or adjusted under 35 U.S.C. 154(b) by 716 days.

(21) Appl. No.: 12/039,086

(22) Filed: Feb. 28, 2008

(65) Prior Publication Data

US 2008/0219498 A1    Sep. 11, 2008

Related U.S. Application Data

(60) Provisional application No. 60/892,895, filed on Mar. 5, 2007.

(51) Int. Cl.
*G06K 9/40* (2006.01)
(52) U.S. Cl. .................. 382/254; 382/274; 382/275
(58) Field of Classification Search .................. 382/254, 382/274, 275
See application file for complete search history.

(56) References Cited

U.S. PATENT DOCUMENTS

| | | | | |
|---|---|---|---|---|
| 5,835,618 A | * | 11/1998 | Fang et al. | 382/132 |
| 6,529,631 B1 | * | 3/2003 | Peterson et al. | 382/232 |
| 6,654,504 B2 | * | 11/2003 | Lubin et al. | 382/254 |
| 2006/0072799 A1 | * | 4/2006 | McLain | 382/128 |
| 2006/0262147 A1 | * | 11/2006 | Kimpe et al. | 345/690 |

* cited by examiner

*Primary Examiner* — Tom Y Lu
(74) *Attorney, Agent, or Firm* — Donald B. Paschburg; F. Chau & Associates, LLC

(57) ABSTRACT

A computer implemented method for applying a visual discrimination model for single image applications includes receiving an image, defining a plurality of regions of interest in the image including a first region located to contain a feature or object to be detected and a second region located to encompass a background, determining metrics for visibility of the feature or object, wherein the metrics are determined by generating channel Just-Noticeable Difference (JND) maps for the single image determining JND summary metrics for the plurality of regions, and determining a difference in JND metrics between the plurality of regions, and adjusting parameters of the JND metrics to increase a visibility of the feature or object in the image.

13 Claims, 3 Drawing Sheets

VISUAL DISCRIMINATION MODEL FOR SINGLE IMAGE APPLICATIONS

CROSS-REFERENCE TO RELATED APPLICATIONS

This application claims the benefit of Provisional Application No. 60/892,895 filed on Mar. 5, 2007 in the United States Patent and Trademark Office, the contents of which are herein incorporated by reference in its entirety.

BACKGROUND OF THE INVENTION

1. Field of the Invention

The present disclosure relates to image processing, and more particularly to a visual discrimination model for single image applications.

2. Description of Related Art

A visual discrimination model (VDM) is used to predict the visibility of differences between two similar images. Typically, one of those images is a high-quality reference and the other is the same image after processing, for example, an enhancement or degradation of the visual quality of the image or an enhancement or degradation of the image to affect the ability of an observer to perform some type of visual task, e.g., signal detection, classification, or quantification. The discriminability of two images can be determined using models of human vision, such as a Visual Image Quality Metric (VIQM) model, that account for the processing of visual stimuli in spatial frequency and orientation channels, the variable sensitivity of the visual system to spatial frequency, and the effects of luminance and contrast masking on image perception. The output of these models is in units of Just-Noticeable Differences (JNDs), where one JND corresponds to a 75% probability that a human observer comparing two images multiple times would correctly detect the differences.

SUMMARY OF THE INVENTION

According to an embodiment of the present disclosure, a computer implemented method for applying a visual discrimination model for single image applications includes receiving an image, defining a plurality of regions of interest in the image including a first region located to contain a feature or object to be detected and a second region located to encompass a background, determining metrics for visibility of the feature or object, wherein the metrics are determined by generating channel Just-Noticeable Difference (JND) maps for the single image, determining JND summary metrics for the plurality of regions, and determining a difference in JND metrics between the plurality of regions, and adjusting parameters of the JND metrics to increase a visibility of the feature or object in the image.

According to an embodiment of the present disclosure, a system for applying a visual discrimination model for single image applications includes a memory device storing a dataset comprising image and a plurality of instructions embodying the system for applying a visual discrimination model to the image, and a processor for receiving the image and executing the plurality of instructions to perform a method including, defining a plurality of regions of interest in the image including a signal region and a noise region located to encompass a background of the signal region, determining metrics for visibility of the signal region, wherein the metrics are determined by generating channel Just-Noticeable Difference (JND) maps for the single image, determining JND summary metrics for the plurality of regions, and determining a difference in JND metrics between the plurality of regions, and adjusting parameters of the JND metrics to increase a visibility of the signal region in the image.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

In practical image analysis only one version of an image may be available. When a VDM is applied to a single image, the channel output in JNDs is a measure of the visibility of image features rather than the differences between two images.

According to an embodiment of the present disclosure, a VDM is applied to a single image for determining a discriminability of two regions of the single image. Such a single image application may be used to quantify the visibility of image features, e.g., lesions or therapeutic objects in medical images, as a function of variables in data acquisition and image reconstruction and processing.

Figure 1:
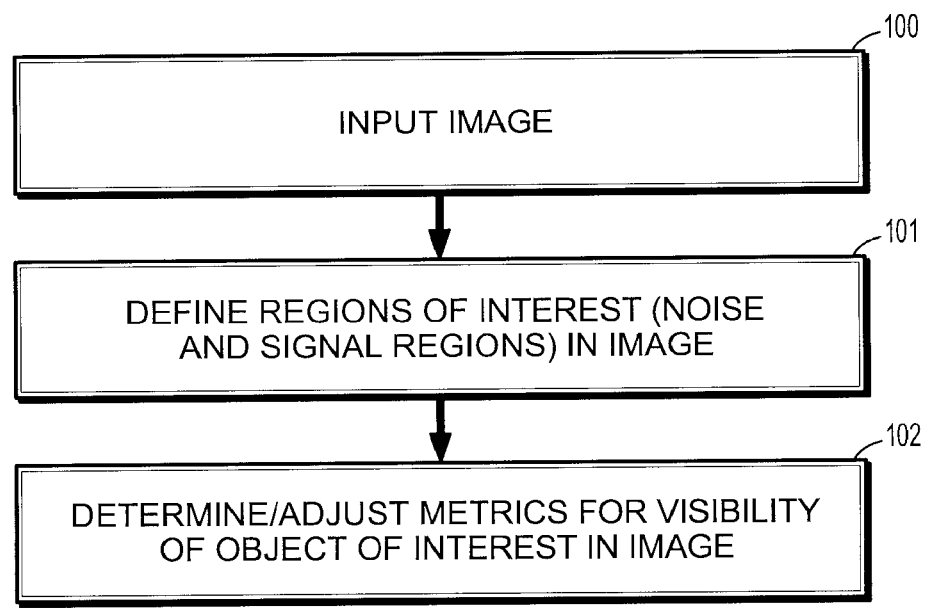
FIG. 1 is a flow chart of a method for visual discrimination model according to an embodiment of the present disclosure.

Referring to FIG. 1, given a single image 100, two regions of interest are defined 101 in the image. A first region is located to contain a feature or an object to be detected and a second region is located to encompass nearby or surrounding background. These two regions can be referred to as the Signal and Noise regions, respectively.

Figure 2:
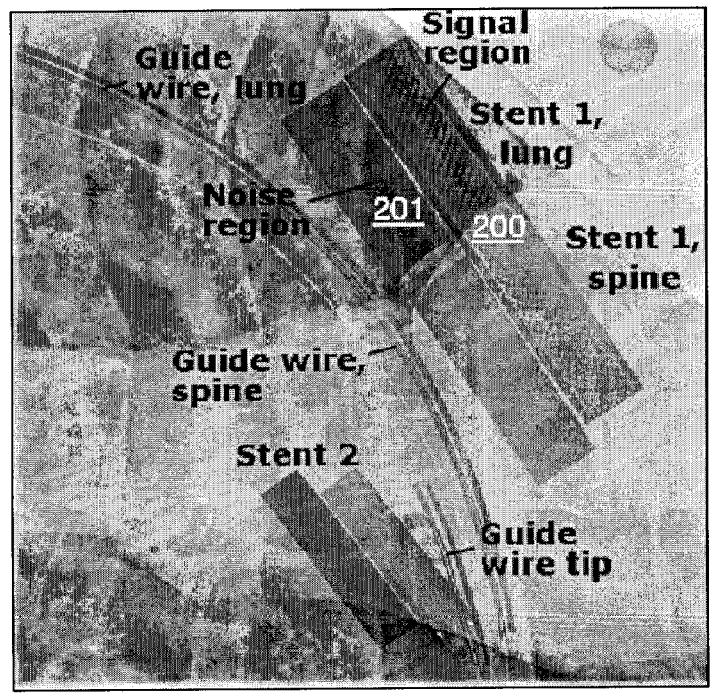
FIG. 2 is an X-ray fluoroscopy image containing interventional guide wires and stents according to an embodiment of the present disclosure.

FIG. 2 shows an x-ray fluoroscopy image in which several pairs of Signal and Noise regions 200 and 201 have been defined for various stents and guide wires used in interventional procedures. In FIG. 2 highlighted regions encompass either an interventional object (Signal region 200) or nearby background (Noise region 201). Metrics for the visibility of the objects are determined 102.

Figure 3:
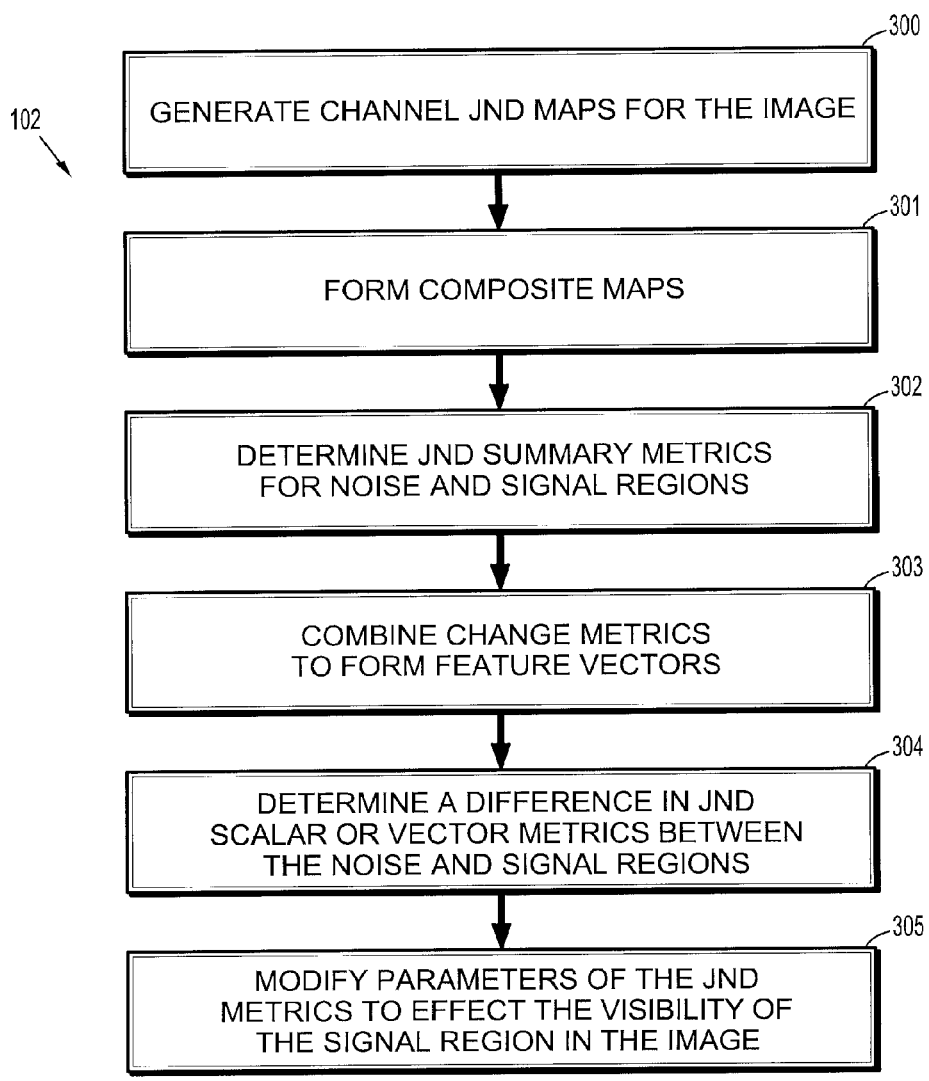
FIG. 3 is a flow chart of a method for visual discrimination model according to an embodiment of the present disclosure.

Referring to FIG. 3, the metrics are determined by generating channel JND maps for the single image 300, optionally forming composite maps by combining channels across orientation and/or spatial frequency 301, computing JND summary metrics (e.g., median, mean, or Minkowski distance) for Noise and Signal regions in each channel or composite map 302, optionally combining channel metrics to form feature vectors 303, and computing the difference in JND scalar or vector metrics between Signal and Noise regions 304. Parameters of the JND scalar or vector metrics are adjusted to modify, e.g., increase, a visibility of the feature or object in the image 305.

The channel JND maps are computed 300 by simulating successive stages in human visual perception through bandpass channels selectively tuned to spatial frequency and orientation, in accordance with properties of center-surround (excitatory-inhibitory) mechanisms and receptive fields in the visual system. These stages account for known characteristics and limitations of the visual system, including ocular blur, luminance adaptation, spatial contrast sensitivity as a function of frequency and luminance, and contrast gain control or masking. Channel output is calibrated to standard JND units using published psychophysical data for the detection and discrimination of contrast stimuli. Channel maps can have the same pixel dimensions as the input image or variable pixel dimensions that decrease with channel frequency.

Map JND values may be combined across channels by applying a maximum function or Minkowski distance function at each pixel location 301. Statistical summary measures 302, primarily the mean or median JND value, can be computed for each channel, or combination of channels, separately for each specified Signal and Noise region of the image. The absolute difference between corresponding JND metrics for Signal and Noise regions is computed. Alternately, the JND metrics for Signal and Noise regions can separately be grouped to form vectors of visual features 303. The distance or dissimilarity between feature vectors for Signal and Noise regions is computed 304, for example using the Euclidean, Minkowski, or Mahalanobis distances. Parameters in the image formation or processing can then be varied to beneficially increase and/or maximize these difference or distance metrics, thereby increasing the visibility of the selected objects or features 305.

Metrics of object or feature visibility defined in this way tend to be insensitive to changes in stochastic background noise, which can affect both Signal and Noise regions similarly. These metrics are also insensitive to shifts in the phase of stochastic noise, which can occur when the same image is acquired multiple times under the same or different conditions. The conventional use of image pairs for VDM analysis of these images would show positive JNDs where the noise had been shifted in pixel location even if the mean amplitude and overall visibility of the noise had not changed. According to an embodiment of the present disclosure, single-image metrics, determined as the difference in summary metrics for the Signal and Noise regions, is invariant to phase shifts in noise.

One exemplary application of the disclosed single-image metrics is in the optimization of image processing to enhance the visibility of selected features or objects. For example, the visibility of stents and guide wires in FIG. 2 can be improved by adjusting a grayscale window center and width and display function, which is the transformation from gray level to display luminance. By varying those parameters in a manner for improving the single-image metrics for stent and guide wire visibility.

Figure 4:
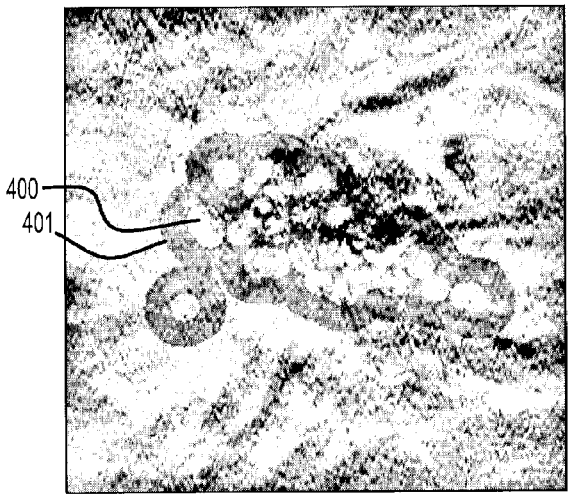
FIG. 4 is a breast tomosynthesis image showing microcalcifications in Signal regions and surrounding background Noise regions used to determine single-image metrics for the visibility of the microcalcifications as a function of data acquisition parameters according to an embodiment of the present disclosure.

Another exemplary application of the disclosed single-image metrics is to medical images as illustrated in FIG. 4, which shows a microcalcification cluster in a slice image obtained by breast tomosynthesis. The Signal regions (e.g., 400) are centered on the individual calcifications while the Noise regions (e.g., 401) contain pixels in circular areas surrounding each calcification. Analysis of the difference between JND metrics for Signal and Noise regions was used to rank-order the visibility of the calcifications as a function of data acquisition modes for a breast tomosynthesis system.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
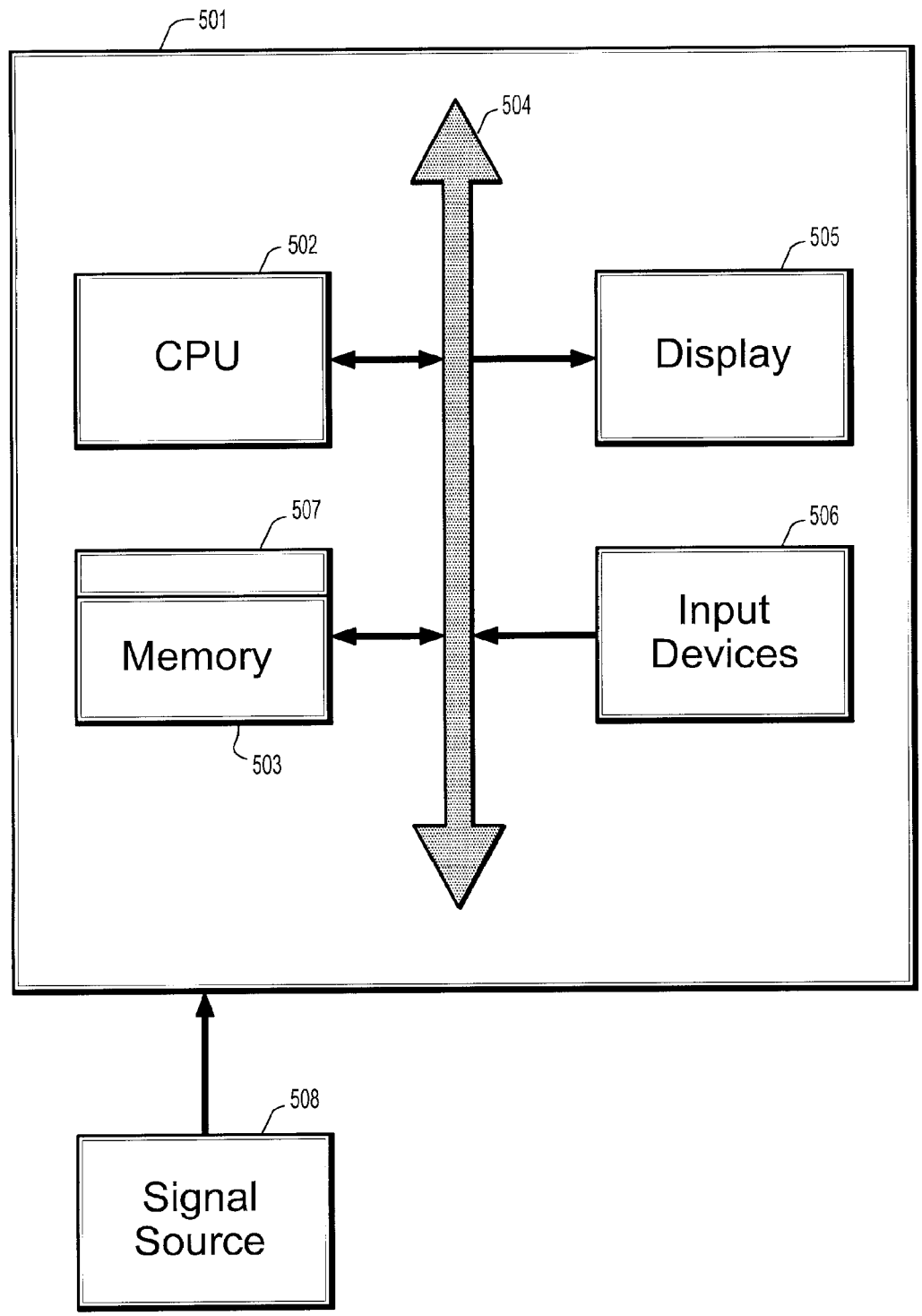
FIG. 5 is a diagram of a computer system for executing computer readable code embodying instructions for single-image analysis according to an embodiment of the present disclosure.

Referring to FIG. 5, according to an embodiment of the present invention, a computer system 501 for a visual discrimination model for single image applications can comprise, inter alia, a central processing unit (CPU) 502, a memory 503 and an input/output (I/O) interface 504. The computer system 501 is generally coupled through the I/O interface 504 to a display 505 and various input devices 106 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general purpose computer system that becomes a specific purpose computer system when executing the routine 507 of the present invention.

The computer platform 501 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a visual discrimination model for single image applications, it is noted that modifications and variations can be made by persons skilled in the art in light of the above teachings. It is therefore to be understood that changes may be made in embodiments of the present disclosure that are within the scope and spirit thereof.

What is claimed is:

1. A computer implemented method for applying a visual discrimination model for single image applications comprising:
    receiving an image;
    defining a plurality of regions of interest in the image including a first region located to contain a feature to be detected and a second region located to encompass a background;
    determining metrics for visibility of the feature, wherein the metrics are determined by generating channel Just-Noticeable Difference (JND) maps for the single image, determining JND summary metrics for the plurality of regions, and determining a difference in JND metrics between the plurality of regions; and
    adjusting parameters of the JND metrics to increase a visibility of the feature in the image.

2. The computer implemented method of claim 1, further comprising forming composite maps by combining the JND maps across channels.

3. The computer implemented method of claim 2, wherein the channels are tuned to an orientation of the image.

4. The computer implemented method of claim 2, wherein the channels are tuned to a spatial frequency of the image.

5. The computer implemented method of claim 1, further comprising combining channel metrics to form feature vectors and compute the distance between vectors for the plurality of regions.

6. The computer implemented method of claim 1, wherein the difference in the JND metrics between the plurality of regions is a measure of a dissimilarity of the plurality of regions.

7. A computer implemented method for applying a visual discrimination model for single image applications comprising:
   receiving an image;
   defining a plurality of regions of interest in the image including a first region located to contain an object to be detected and a second region located to encompass a background;
   determining metrics for visibility of the object, wherein the metrics are determined by generating channel Just-Noticeable Difference (JND) maps for the single image, determining JND summary metrics for the plurality of regions, and determining a difference in JND metrics between the plurality of regions; and
   adjusting parameters of the JND metrics to increase a visibility of the object in the image.

8. The computer implemented method of claim 7, further comprising forming composite maps by combining the JND maps across channels.

9. The computer implemented method of claim 8, wherein the channels are tuned to an orientation of the image.

10. The computer implemented method of claim 8, wherein the channels are tuned to a spatial frequency of the image.

11. The computer implemented method of claim 7, further comprising combining channel metrics to form feature vectors and compute the distance between vectors for the plurality of regions.

12. The computer implemented method of claim 7, wherein the difference in the JND metrics between the plurality of regions is a measure of a dissimilarity of the plurality of regions.

13. A system for applying a visual discrimination model for single image applications comprising:
   a memory device storing a dataset comprising image and a plurality of instructions embodying the system for applying a visual discrimination model to the image; and
   a processor for receiving the image and executing the plurality of instructions to perform a method comprising,
      defining a plurality of regions of interest in the image including a signal region and a noise region located to encompass a background of the signal region;
      determining metrics for visibility of the signal region, wherein the metrics are determined by generating channel Just-Noticeable Difference (JND) maps for the single image, determining JND summary metrics for the plurality of regions, and determining a difference in JND metrics between the plurality of regions; and
      adjusting parameters of the JND metrics to increase a visibility of the signal region in the image.

* * * * *